United States Patent
Suekuni et al.

(10) Patent No.: US 10,408,120 B2
(45) Date of Patent: Sep. 10, 2019

(54) OPENING/CLOSING VALVE STRUCTURE

(71) Applicant: MAZDA MOTOR CORPORATION, Hiroshima (JP)

(72) Inventors: Einosuke Suekuni, Higashihiroshima (JP); Masaaki Sato, Higashihiroshima (JP); Junji Umemura, Aki-gun (JP); Shuhei Tsujita, Hatsukaichi (JP); Hisayoshi Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/319,129

(22) PCT Filed: Aug. 10, 2015

(86) PCT No.: PCT/JP2015/072602
§ 371 (c)(1),
(2) Date: Dec. 15, 2016

(87) PCT Pub. No.: WO2016/042943
PCT Pub. Date: Mar. 24, 2016

(65) Prior Publication Data
US 2017/0114711 A1  Apr. 27, 2017

(30) Foreign Application Priority Data

Sep. 19, 2014  (JP) .................. 2014-190910

(51) Int. Cl.
*F02D 9/10* (2006.01)
*F02B 31/02* (2006.01)
(Continued)

(52) U.S. Cl.
CPC .............. *F02B 31/02* (2013.01); *F02B 31/06* (2013.01); *F02B 37/02* (2013.01); *F02B 37/12* (2013.01);
(Continued)

(58) Field of Classification Search
CPC .... F02B 2031/006; F02B 31/06; F02B 31/02; F16K 1/223; F16K 1/224; F16K 1/22;
(Continued)

(56) References Cited

U.S. PATENT DOCUMENTS 2,596,787 A * 5/1952 Ottinger ................ C21B 9/12
126/292
3,127,904 A * 4/1964 Stillwagon ............ F16K 1/2265
137/315.24
(Continued)

FOREIGN PATENT DOCUMENTS

CN  1185195 A  6/1998
CN  102537387 A  7/2012
(Continued)

OTHER PUBLICATIONS

International Search Report issued in PCT/JP2015/072602; dated Nov. 2, 2015.
(Continued)

*Primary Examiner* — Hung Q Nguyen
*Assistant Examiner* — Mark L. Greene
(74) *Attorney, Agent, or Firm* — Studebaker & Brackett PC

(57) ABSTRACT

An opening/closing valve structure for an engine is provided with a valve body for opening and closing an intake passage or an exhaust passage of the engine; a pair of bush members mounted on axial ends of the valve body; and a shaft member axially passing through one of the bush members and projecting from the bush member by a predetermined length within one end of the valve body. Each of the bush members is mounted in such a manner that a part of the bush member is axially received in an end of the valve body and the remaining part thereof axially projects from the end of the valve body. A portion of the shaft member projecting
(Continued)

from the one of the bush members is connected to the valve body in such a manner that relative rotation of the shaft member with respect to the valve body is disabled.

8 Claims, 10 Drawing Sheets

(51) Int. Cl.
  *F02B 31/06*   (2006.01)
  *F02B 37/02*   (2006.01)
  *F02B 37/12*   (2006.01)
  *F16K 1/22*   (2006.01)

(52) U.S. Cl.
  CPC ........... *F02D 9/106* (2013.01); *F02D 9/1095* (2013.01); *F16K 1/223* (2013.01); *F16K 1/224* (2013.01); *Y02T 10/144* (2013.01); *Y02T 10/146* (2013.01)

(58) Field of Classification Search
  CPC .......... F16K 1/222; F02D 9/102; F02D 9/103; F02D 9/1005; F02D 9/106; F02D 9/109; F02D 9/1095; F02D 9/10
  USPC ........................................................ 251/308
  See application file for complete search history.

(56) References Cited

U.S. PATENT DOCUMENTS

| | | | |
|---|---|---|---|
| 5,531,205 | A | 7/1996 | Cook et al. |
| 9,388,770 | B2 * | 7/2016 | Tsujita .................. F02M 26/44 |
| 2002/0056824 | A1 | 5/2002 | Rentschler et al. |
| 2004/0003841 | A1 | 1/2004 | Rentschler et al. |
| 2007/0051913 | A1 | 3/2007 | Torii et al. |
| 2011/0239638 | A1 * | 10/2011 | Yamagata ................ F02D 9/04 |
| | | | 60/324 |
| 2013/0206238 | A1 * | 8/2013 | Gent ....................... F16K 1/224 |
| | | | 137/1 |
| 2014/0109569 | A1 * | 4/2014 | Tsujita .................... F02D 23/00 |
| | | | 60/599 |
| 2015/0136055 | A1 | 5/2015 | Ishihara |
| 2017/0058763 | A1 * | 3/2017 | Suekuni ................. F01N 13/10 |
| 2017/0234211 | A1 * | 8/2017 | Uehane ................. F02B 37/183 |
| | | | 60/602 |
| 2017/0241329 | A1 * | 8/2017 | Uehane ................... F01D 9/026 |
| 2017/0260912 | A1 * | 9/2017 | Tsujita .................... F02D 9/106 |

FOREIGN PATENT DOCUMENTS

| | | | | |
|---|---|---|---|---|
| DE | 19918777 | A1 | 10/2000 | |
| DE | 102006000434 | A1 | 3/2007 | |
| DE | 102006016681 | A1 | 10/2007 | |
| DE | 202007013151 | U1 | 2/2009 | |
| DE | 102008030005 | A1 | 12/2009 | |
| EP | 2148076 | A1 * | 1/2010 | ............ F02B 31/06 |
| FR | 2 950 947 | A1 | 4/2011 | |
| GB | 2495220 | B * | 1/2015 | ............ F02D 9/106 |
| JP | S62-052250 | U | 4/1987 | |
| JP | S63-128238 | U | 8/1988 | |
| JP | 2001-241556 | A | 9/2001 | |
| JP | 2007-064176 | A | 3/2007 | |
| JP | 2013-256879 | A | 12/2013 | |

OTHER PUBLICATIONS

An Office Action issued by the German Patent Office dated Oct. 6, 2017, which corresponds to German Patent Application 11 2015 003 531.1 and is related to U.S. Appl. No. 15/319,129.

An Office Action mailed by the State Intellectual Property Office of the People's Republic of China dated May 30, 2018, which corresponds to Chinese Patent Application No. 201580028961.6 and is related to U.S. Appl. No. 15/319,129.

\* cited by examiner

OPENING/CLOSING VALVE STRUCTURE

TECHNICAL FIELD

The present invention relates to an opening/closing valve structure, and more particularly, to a structure of an opening/closing valve for opening and closing at least one of an intake passage and an exhaust passage of an engine.

BACKGROUND ART

Conventionally, there is known an opening/closing valve including a plurality of butterfly valves, and shaft portions for connecting the butterfly valves to each other. For instance, Patent Literature 1 discloses an opening/closing valve including three butterfly valves disposed in an intake system of an internal combustion engine, and shaft portions for connecting the butterfly valves to each other. Axially projecting tubular-shaped shaft portions are integrally formed on opposite ends of the opening/closing valve. Supporting the shaft portions on opposite ends of the opening/closing valve by bearings makes it possible to rotatably support the opening/closing valve.

As disclosed in Patent Literature 1, when the opening/closing valve is provided to stride over a plurality of passages in an intake system of an engine, the butterfly valves or the shaft portions may cause plastic deformation as a result of application of intake pressure. This may make it difficult to perform smooth opening/closing operations and may make it difficult to secure the reliability of the opening/closing valve. When the opening/closing valve is provided in an exhaust system of the engine, thermal deformation due to heat of exhaust gas may be generated in addition to the above. This may cause another drawback.

Patent Literature 1 describes differentiating the directions in which the shaft portions for connecting the butterfly valves are likely to bend. However, Patent Literature 1 takes into consideration a problem on dimensional precision, which is involved when butterfly valves and shaft portions are integrally molded of resin. Specifically, warp or deflection is likely to occur when resin is molded. A variation in the size or shape of shaft portions accompanied by warp or deflection may cause an increase in the sliding resistance. The measure disclosed, in Patent Literature 1 is for the purpose of preventing the aforementioned drawback (i.e. for the purpose of suppressing an increase in the sliding resistance), and is not a measure for eliminating the aforementioned drawback i.e. deformation of butterfly valves or shaft portions by application of heat or pressure.

CITATION LIST

Patent Literature

Patent Literature 1: Japanese Unexamined Patent Publication No. 2001-241556

SUMMARY OF INVENTION

In view of the aforementioned drawback of an opening/closing valve for opening and closing at least one of an intake passage and an exhaust passage of an engine, an object of the invention is to provide an opening/closing valve structure which enables to suppress deformation by application of heat or pressure, and to smoothly perform opening/closing operations with enhanced reliability.

In order to achieve the aforementioned object, the present invention is directed to a structure of an opening/closing valve for opening and closing at least one of an intake passage and an exhaust passage of an engine. The opening/closing valve structure is provided with a valve body including a plurality of butterfly valves, and a shaft portion for connecting the butterfly valves to each other; a pair of bush members mounted on axially opposite ends of the valve body, and configured to be rotatably supported on a wall portion of the intake passage or of the exhaust passage; and a shaft member axially passing through one of the bush members, and projecting from the bush member by a predetermined length within an end of the valve body. Each of the bush members is mounted in such a manner that a part of the bush member is axially received in an end of the valve body, and a remaining part thereof axially projects from the end of the valve body. A portion of the shaft member projecting from the one of the bush members is connected to the valve body in such a manner that relative rotation of the shaft member with respect to the valve body is disabled.

According to the present invention, it is possible to suppress deformation of an opening/closing valve to be provided in an intake passage and an exhaust passage of an engine due to application of heat or pressure. This is advantageous in smoothly performing opening/closing operations of the opening/closing valve, and in securing the reliability.

DESCRIPTION OF EMBODIMENTS

Figure 1:
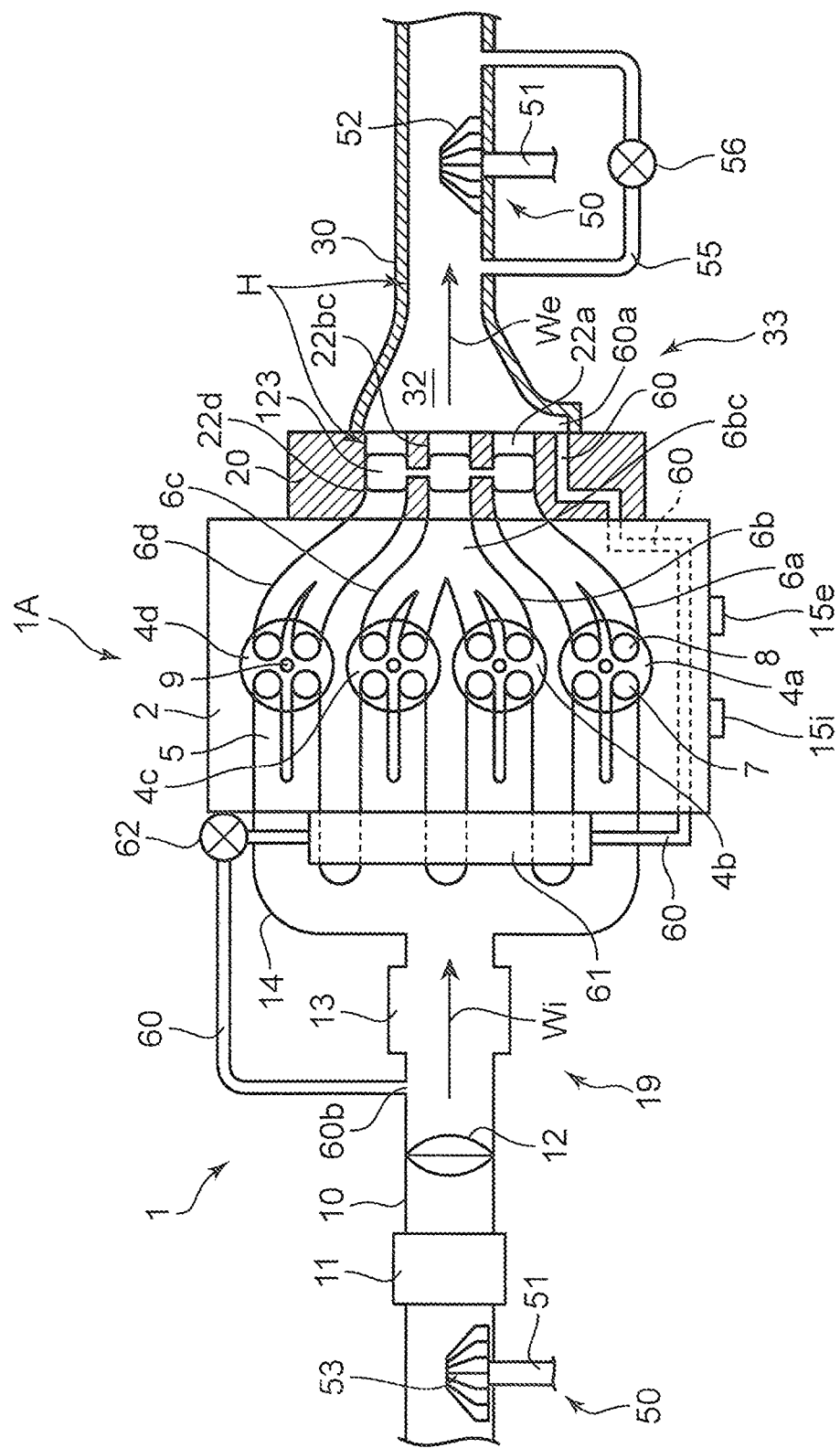
FIG. 1 is a diagram illustrating an overall configuration of an engine according to an embodiment of the present invention.

FIG. 1 illustrates an overall configuration of an engine 1 according to the embodiment. The engine 1 is an in-line 4-cylinder 4-cycle spark ignition engine to be mounted in a vehicle as a power source for traveling. The engine 1 includes an engine body 1A, an intake passage 19 connected to a surface of the engine body 1A on the intake side, an exhaust passage 33 connected to a surface of the engine body 1A on the exhaust side, and a turbocharger 50 which is driven by exhaust gas for supercharging intake air. In the embodiment, the terms "upstream" and "downstream" are used when streams of gas flowing through a relevant portion are referred to.

The engine body 1A includes a cylinder head 2 and a cylinder block (not illustrated) as main members, and is further provided with a first cylinder 4a, a second cylinder 4b, a third cylinder 4b, and a fourth cylinder 4c arrayed in a row.

The intake passage 19 is provided with an intake manifold 14 connected to a surface of the cylinder head 2 on the intake side, an intake pipe 10 provided on the upstream side than the intake manifold 14, and a surge tank 13 provided between the intake pipe 10 and the intake manifold 14.

The exhaust passage 33 is provided with a block-shaped exhaust manifold 20 (corresponding to an upstream housing member in the claims) connected to a surface of the cylinder head 2 on the exhaust side, and a supercharger casing 30 (corresponding to a downstream housing member in the claims) connected to a surface of the exhaust manifold 20 on the downstream side.

The turbocharger 50 has a well-known structure. The turbocharger 50 is provided with a turbine 52 to be disposed in the exhaust passage 33, a compressor 53 to be disposed in the intake passage 19, and a connecting shaft 51 for connecting the turbine 52 and the compressor 53 to each other. FIG. 1 illustrates the turbine 52 and the compressor 53 independently of each other for the sake of convenience. Actually, however, the turbine 52 is disposed at an end of the connecting shaft 51, and the compressor 53 is disposed at the other end of the connecting shaft 51. The intake passage 19 and the exhaust passage 33 are proximate to each other in the vicinity of the installation position of the turbocharger 50. The turbocharger 50 is interposed between the intake passage 19 and the exhaust passage 33.

The turbocharger 50 is accommodated in the supercharger casing 30 in a posture that the axial direction of the turbocharger 50 is aligned with the cylinder array direction of the engine 1. When the compressor 53 is driven accompanied by rotation of the turbine 52, which is rotated by application of pressure of exhaust gas We, the turbocharger 50 compress intake air Wi and increases the intake pressure. A waste passage 55 which bypasses the turbine 52 in the turbocharger 50, and a waste gate valve 56 for opening and closing the waste passage 55 are provided in the exhaust passage 33.

An intercooler 11 for cooling intake air, and a throttle valve 12 for regulating the amount of intake air depending on an operating condition of the engine 1 are provided in the intake pipe 10. The intercooler 11 is disposed on the downstream side of the compressor 53, and the throttle valve 12 is disposed on the downstream side of the intercooler 11 and on the upstream side of the surge tank 13.

The intake manifold 14 includes four branch pipes branched from the surge tank 13. The downstream end of each of the branch pipes is connected to the cylinder head 2. Specifically, intake air introduced to the surge tank 13 through the intake pipe 10 is guided to the first to fourth cylinders 4a to 4b (hereinafter, when the first to fourth cylinders 4a and 4b are generically referred to, the first to fourth cylinders 4a to 4b are simply referred to as cylinders 4) through each of the branch pipes of the intake manifold 14.

The cylinders 4 have a well-known structure. Each of the cylinders 4 includes a combustion chamber on the upper side of a piston (not illustrated) which is reciprocatably accommodated in the cylinder 4. The cylinder head 2 is provided with a plurality of intake ports 5 for sucking intake air Wi to be supplied from the intake manifold 14 into the combustion chambers, a plurality of exhaust ports (first to third exhaust ports) 6a, 6bc, and 6d for discharging exhaust gas We generated in the combustion chambers to the exhaust passage 33, intake valves 7 for opening and closing the intake ports 5, and exhaust valves 8 for opening and closing the exhaust ports 6a, 6bc, and 6d. An ignition plug 9 is provided at a top of each of the combustion chambers. A fuel injection valve (not illustrated) for directly injecting fuel into each of the combustion chambers is provided at an appropriate position.

In the embodiment, each of an intake cycle, a compression cycle, an expansion cycle and an exhaust cycle is executed at a timing displaced by 180° CA in the order of the first cylinder 4a, the third cylinder 4c, the fourth cylinder 4d, and the second cylinder 4b. In the specification, the term "° CA" denotes a rotational angle (crank angle) of a crankshaft (not illustrated), which is an output shaft of the engine 1.

The cylinder head 2 is provided with a variable valve timing mechanism 15i on the intake side, and a variable valve timing mechanism 15e on the exhaust side. These variable valve timing mechanisms 15i and 15e shift valve opening timings and valve closing timings of the intake valves 7 and the exhaust valves 8 in parallel, while keeping the valve opening periods of the intake valves 7 and the exhaust valves 8.

In the embodiment, the valve opening timings and the valve closing timings of the intake valves 7 and the exhaust valves 8 are set in such a manner that the valve opening period of the intake valve 7 and the valve opening period of the exhaust valve 8 are overlapped by a predetermined period, and the exhaust valve 8 of any one of the cylinders 4 is started to open during the overlap period of the other one of the cylinders 4, which is immediately before the target cylinder 4 in terms of the exhaust order when the engine 1 is in a low speed range (in an operating range where the amount of exhaust gas acting on the turbine 52 is smaller than a predetermined amount).

Specifically, the exhaust valve 8 of the third cylinder 4c is opened during an overlap period of the intake valve 7 and the exhaust valve 8 of the first cylinder 4a. The exhaust valve 8 of the fourth cylinder 4d is opened during an overlap period of the intake valve 7 and the exhaust valve 8 of the third cylinder 4c. The exhaust valve 8 of the second cylinder 4b is opened during an overlap period of the intake valve 7 and the exhaust valve 8 of the fourth cylinder 4d. The exhaust valve 8 of the first cylinder 4a is opened during an overlap period of the intake valve 7 and the exhaust valve 8 of the second cylinder 4b.

The first exhaust port 6a is an exhaust port dedicatedly used for the first cylinder 4a. The first exhaust port 6a is formed to extend from the first cylinder 4a to the surface of the cylinder head 2 on the exhaust side while keeping an independent state thereof. The second exhaust port 6bc is an exhaust port, which is commonly used between the second cylinder 4b and the third cylinder 4c which are not consecutive in terms of the exhaust order. The second exhaust port 6bc includes a branch port 6b extending from the second cylinder 4b, a branch port 6c extending from the third cylinder 4c, and a collective port, which is a merging portion of the downstream ends of the branch ports 6b and 6c. The collective port is opened toward the surface of the cylinder head 2 on the exhaust side. The third exhaust port 6d is an exhaust port dedicatedly used for the fourth cylinder 4d. The third exhaust port 6d is formed to extend from the fourth cylinder 4d to the surface of the cylinder head 2 on the exhaust side while keeping an independent state thereof.

Figure 2:
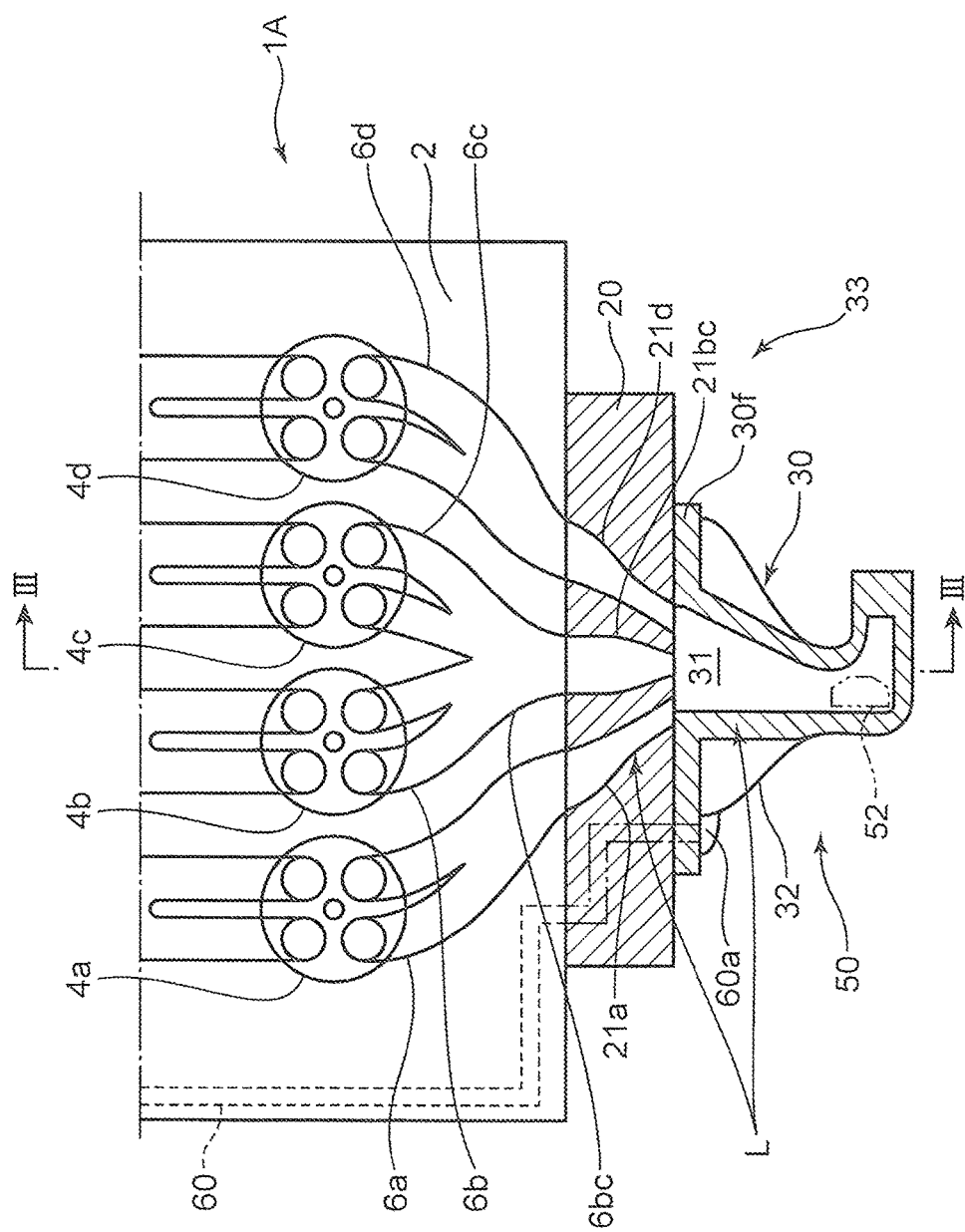
FIG. 2 is a diagram illustrating a configuration of a cylinder head, an exhaust manifold, and a supercharger casing of the engine.
Figure 3:
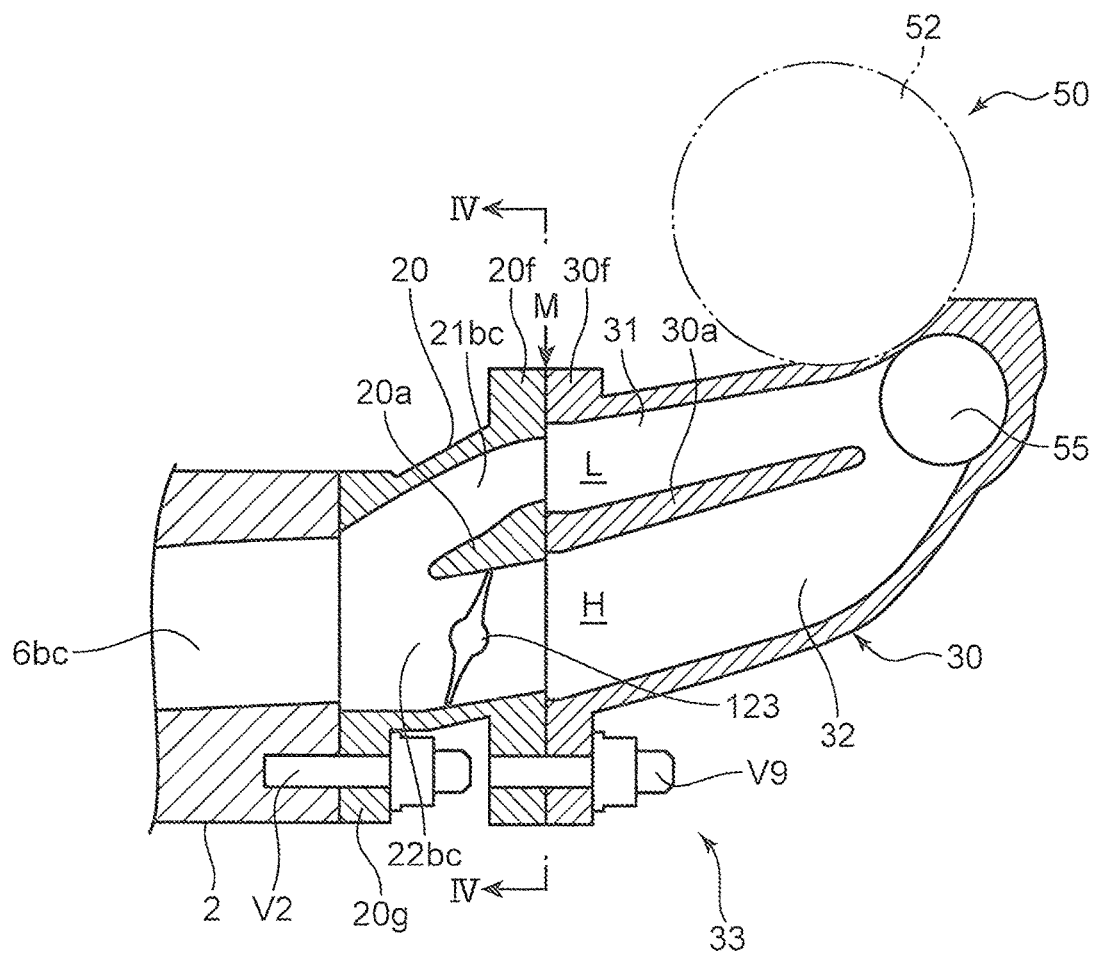
FIG. 3 is an arrow sectional view taken along the line III-III in FIG. 2.

As illustrated in FIG. 1 to FIG. 3, a low-speed passage L (corresponding to a first passage in the claims), and a high-speed passage L (corresponding to a second passage in the claims) are formed in the exhaust manifold 20 and in the supercharger casing 30. The low-speed passage L and the high-speed passage H are formed to pass through both of the exhaust manifold 20 and the supercharger casing 30 in a state that the low-speed passage L and the high-speed passage H are separated from each other in the up-down direction. Regarding the sectional plan views of FIG. 1 and FIG. 2, FIG. 1 illustrates the high-speed passage H (a first lower independent passage 22a, a second lower independent passage 22bc, and a third lower independent passage 22d; and a lower collective passage 32 to be described later), and FIG. 2 illustrates the low-speed passage L (a first upper independent passage 21a, a second upper independent passage 21bc, and a third upper independent passage 21d; and an upper collective passage 31 to be descried later).

As illustrated in FIG. 1 and FIG. 3, the high-speed passage H includes the first to third lower independent passages 22a, 22bc, and 22d (corresponding to independent passages in the claims) formed in the exhaust manifold 20, and the lower collective passage 32 (corresponding to a collective passage in the claims) formed in the supercharger casing 30.

As illustrated in FIG. 2 and FIG. 3, the low-speed passage L includes the first to third upper independent passages 21a, 21bc, and 21d (corresponding to independent passages in the claims) formed in the exhaust manifold 20, and the upper collective passage 31 (corresponding to a collective passage in the claims) formed in the supercharger casing 30.

Figure 4:
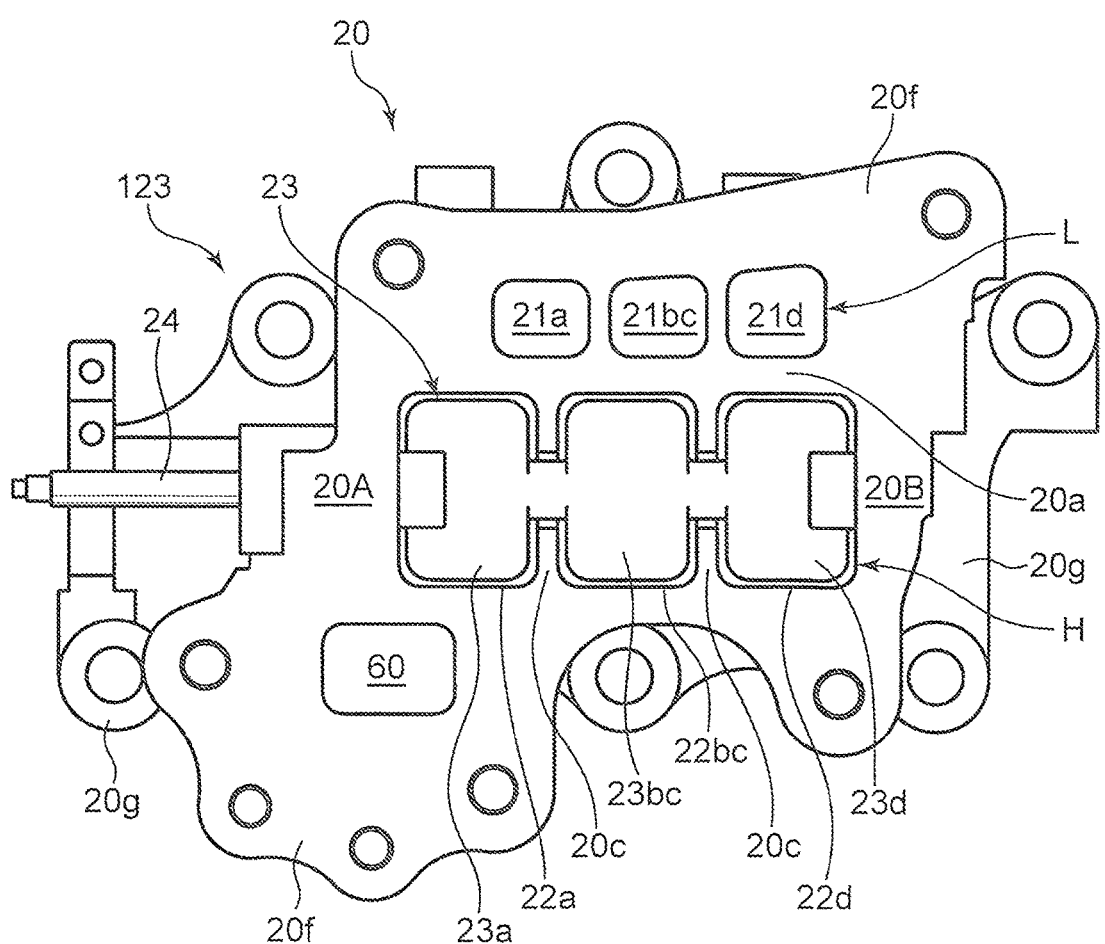
FIG. 4 is an arrow view taken along the line IV-IV in FIG. 3.

As illustrated in FIG. 3 and FIG. 4, the first to third upper independent passages 21a, 21bc, and 21d; and the first to third lower independent passages 22a, 22bc, and 22d in the exhaust manifold 20 are separated into an upper section and a lower section by a partition wall 20a extending in the flow direction of exhaust gas We.

The exhaust manifold 20 includes a mounting flange 20g on a surface thereof on the upstream side. The exhaust manifold 20 is connected to the cylinder head 2 by an engagement member V2 (see FIG. 3) constituted by a stud bolt and a nut to be engaged via the mounting flange 20g. In the connected state, the upstream ends of the first to third lower independent passages 22a, 22bc, and 22d, and the upstream ends of the first to third upper independent passages 21a, 21bc, and 21d are respectively connected to the downstream ends of the first to third exhaust ports 6a, 6bc, and 6d formed in the cylinder head 2. Specifically, the upstream end of the first lower independent passage 22a and the upstream end of the first upper independent passage 21a are merged, and the merging portion is disposed to communicate with the downstream end of the first exhaust port 6a for the first cylinder 4a. Further, the upstream end of the second lower independent passage 22bc and the upstream end of the second upper independent passage 21bc are merged, and the merging portion is disposed to communicate with the downstream end of the second exhaust port 6bc for the second and third cylinders 4b and 4c. Furthermore, the upstream end of the third lower independent passage 22d and the upstream end of the third upper independent passage 21d are merged, and the merging portion is disposed to communicate with the downstream end of the third exhaust port 6d for the fourth cylinder 4d.

As illustrated in FIG. 1 to FIG. 4, the first to third upper independent passages 21a, 21bc, and 21d are formed to have a small flow area of exhaust gas, as compared with the first to third lower independent passages 22a, 22bc, and 22d.

Further, as illustrated in FIG. 2, the downstream ends of the first to third upper independent passages 21a, 21bc, and 21d are formed into a tapered shape in such a manner that the flow area of exhaust gas gradually decreases toward the downstream side. On the other hand, as illustrated in FIG. 1, the downstream ends of the first to third lower independent passages 22a, 22bc, and 22d are not formed into a tapered shape.

As illustrated in FIG. 2, the downstream ends of the first to third upper independent passages 21a, 21bc, and 21d are proximate to each other in such a manner that the downstream ends are merged at a position (center of the engine) corresponding to the center of the engine body 1A in the cylinder array direction. Likewise, as illustrated in FIG. 1, the downstream ends of the first to third lower independent passages 22a, 22bc, and 22d are proximate to each other in such a manner that the downstream ends are merged at the center of the engine.

As illustrated in FIG. 1, FIG. 3, and FIG. 4, a variable exhaust valve 123 (corresponding to an opening/closing valve in the claims) is disposed in the first to third lower independent passages 22a, 22bc, and 22d. The variable exhaust valve 123 is driven in such a manner as to open the first to third lower independent passages 22a, 22bc, and 22d in an operating range where the amount of exhaust gas acting on the turbine 52 is equal to or larger than a predetermined amount, and to close the first to third lower independent passages 22a, 22bc, and 22d in an operating range where the amount of exhaust gas acting on the turbine 52 is smaller than the predetermined amount (throttle control). A structure of the variable exhaust valve 123 will be described later.

As illustrated in FIG. 3, the upper collective passage 31 and the lower collective passage 32 in the supercharger casing 30 are separated into upper and lower sections by a partition wall 30a extending in the flow direction of exhaust gas We. The upstream end of each of the upper collective passage 31 and the lower collective passage 32 is formed to be widened in the cylinder array direction.

The supercharger casing 30 includes a mounting flange 30f on a surface thereof on the upstream side. The supercharger casing 30 is connected to a surface (a mounting flange 20f) of the exhaust manifold 20 on the downstream side by an engagement member V9 constituted by a stud bolt and a nut to be engaged via the mounting flange 30f. In the connected state, the downstream ends of the first to third upper independent passages 21a, 21bc, and 21d in the exhaust manifold 20 are commonly connected to the upstream end of the upper collective passage 31 in the supercharger casing 30. The downstream ends of the first to third lower independent passages 22a, 22bc, and 22d in the exhaust manifold 20 are commonly connected to the upstream end of the lower collective passage 32 in the supercharger casing 30. According to this configuration, in the upper collective passage 31, exhaust gas discharged from the first to third upper independent passages 21a, 21bc, and 21d is collected, and in the lower collective passage 32, exhaust gas discharged from the first to third lower independent passages 22a, 22bc, and 22d is collected.

The turbine 52 is disposed on the downstream side of the upper collective passage 31 and of the lower collective passage 32. Specifically, the upper and lower collective passages 31 and 32 are passages for introducing exhaust gas We discharged from the engine body 1A through the exhaust manifold 20 into the turbine 52 of the turbocharger 50. As illustrated in FIG. 1 to FIG. 3, the upper collective passage 31 is formed to have a small flow area of exhaust gas, as compared with the lower collective passage 32.

As illustrated in FIG. 1 and FIG. 2, the engine 1 is provided with an EGR passage 60 which communicates between the exhaust passage 33 and the intake passage 19 in order to perform exhaust gas recirculation (EGR), in which a part of exhaust gas We flowing through the exhaust passage 33 is refluxed to the intake passage 19. An entrance portion 60a of the FUR passage 60 on the side of the exhaust passage 33 is opened toward the lower collective passage 32 on the downstream side than the variable exhaust valve 123. An exit portion 60b of the EGR passage 60 on the side of the intake passage 19 is opened between the throttle valve 12 and the surge tank 13. An FOR cooler 61 for cooling gas passing through the EGR passage 60, and an FOR valve 62 for opening and closing the EGR passage 60 are provided in the EGR passage 60. In the embodiment, a part of the EGR passage 60 on the upstream side is formed within the exhaust manifold 20 and in the cylinder head 2.

As illustrated in FIG. 3, when throttle control of closing the variable exhaust valve 123 is executed, exhaust gas We is introduced to the turbine 52 through the first to third upper independent passages 21a, 21bc, and 21d, and through the upper collective passage 31. On the other hand, when the variable exhaust valve 123 is opened (when throttle control is not executed), exhaust gas We is introduced to the turbine 52 through the first to third lower independent passages 22a, 22bc, and 22d, and through the lower collective passage 32, as well as through the aforementioned passages. Specifically, the low-speed passage L including the first to third upper independent passages 21a, 21bc, and 21d, and the upper collective passage 31 is a passage through which exhaust gas We is constantly allowed to flow regardless of whether the engine speed is high or low; and the high-speed passage H including the first to third lower independent passages 22a, 22bc, and 22d, and the Lower collective passage 32 is a passage through which exhaust gas We is allowed to flow only when the amount of exhaust gas acting on the turbine 52 is equal to or larger than a predetermined amount.

As described above, throttle control of closing the variable exhaust valve 123 is executed when the engine 1 is in a low speed range where the amount of exhaust gas acting on the turbine 52 is smaller than the predetermined amount. In this case, exhaust gas We is allowed to pass only through the low-speed passage L (the first to third upper independent passages 21a, 21bc, and 21d, and the upper collective passage 31). The flow area of exhaust gas through the low-speed passage L is relatively small. Therefore, exhaust gas We is allowed to flow through the low-speed passage L at a high speed. Specifically, when the engine 1 is in a low speed range, the flow velocity of exhaust gas We acting on the turbine 52 is increased by throttle control, and a supercharging pressure is increased (dynamic supercharging effect).

Further, in the embodiment, when the engine 1 is in a low speed range where throttle control of closing the variable exhaust valve 123 is executed, as described above, the intake valve 7 and the exhaust valve 8 of each of the cylinders 4 are opened in such a manner that the valve opening period of the intake valve 7 and the valve opening period of the exhaust valve 8 of each of the cylinders 4 are overlapped, and the exhaust valve 8 of each of the cylinders 4 is opened during the overlap period of the other one of the cylinders 4, which is immediately before the target cylinder 4 in terms of the exhaust order.

According to the aforementioned configuration, when the engine 1 is in a low speed range, scavenging by a so-called ejector effect is promoted. Specifically, when the engine 1 is in a low speed range, only the first to third upper independent passages 21a, 21bc, and 21d whose flow area of exhaust gas is small are opened by throttle control of the variable exhaust valve 123. Therefore, exhaust gas We (blowdown gas) discharged immediately after opening of the exhaust valve 8 is allowed to flow toward the downstream side while keeping the high speed through the first to third upper independent passages 21a, 21bc, and 21d. Further, the downstream ends of the first to third upper independent passages 21a, 21bc, and 21d have a tapered shape. Therefore, the speed of blowdown gas discharged from the downstream ends of the upper independent passages 21a, 21bc, and 21d into the upper collective passage 31 is further increased. In this way, a strong negative pressure by an ejector effect is generated around the blowdown gas discharged at a high speed into the upper collective passage 31. When a strong negative pressure is generated in the upper collective passage 31 by blowdown gas from a certain cylinder 4, the other one of the cylinders 4 (preceding cylinder), which is immediately before the certain cylinder 4 in terms of the exhaust order, is in an overlap period when both of the intake valve 7 and the exhaust valve 8 are opened. Therefore, burned gas (residual gas) remaining in the preceding cylinder 4 is sucked toward the exhaust side by a negative pressure operation by the ejector effect. This makes it possible to promote scavenging of each of the cylinders 4, and to increase the amount of intake air to the cylinders 4 (dynamic exhaust effect).

Further, residual gas sucked from the cylinders 4 by the ejector effect is added to exhaust gas We. This makes it possible to increase the flow volume of exhaust gas We acting on the turbine 52. This is also advantageous in increasing the driving force of the turbine 52, and in increasing the supercharging pressure when the engine 1 is in a low speed range.

The aforementioned configuration is described in detail. For instance, when the variable exhaust valve 123 is opened, an ejector effect is not obtained. As a result, a part of blowdown gas discharged from the first to third upper independent passages 21a, 21bc, and 21d, and from the first to third lower independent passages 22a, 22bc, and 22d returns to (flows back to) another passage via the upper collective passage 31 and via the lower collective passage 32. This provides the same effect as the effect of increasing the volume of the exhaust passage 33. On the other hand, when an ejector effect by throttle control of the variable exhaust valve 123 is exhibited, blowdown gas discharged from any one of the first to third upper independent passages 21a, 21bc, and 21d is not only inoperative to return (flow back) but also sucks exhaust gas We from another passage. This provides the same effect as the effect of decreasing the volume of the exhaust passage 33. As described above, in the embodiment, when the engine 1 is in a low speed range, an ejector effect based on throttle control of the variable exhaust valve 123 is exhibited. This makes it possible to obtain an effect substantially equivalent to an effect of reducing the volume of the exhaust passage 33. In this way, it is possible to promote a dynamic supercharging effect and a dynamic exhaust effect.

On the other hand, when the engine 1 is in a high speed range where the amount of exhaust gas acting on the turbine 52 is equal to or larger than the predetermined amount, throttle control is released, and the variable exhaust valve 123 is opened. As a result, exhaust gas We is allowed to pass through both of the low-speed passage L (the first to third upper independent passages 21a, 21bc, and 21d, and the upper collective passage 31), and through the high-speed passage H (the first to third lower independent passages 22a, 22bc, and 22d, and the lower collective passage 32). This makes it possible to increase the flow area of exhaust gas. This is advantageous in avoiding obstruction of flow of exhaust gas We by an excessive increase in the internal pressure of the exhaust passage 33.

As described above, in the embodiment, the variable exhaust valve 123 is used as a constituent element of a dynamic supercharging (dynamic exhaust) system provided in the exhaust passage 33 of the engine 1. Next, a structure of the variable exhaust valve 123 is described referring to FIG. 4 to FIG. 8.

The variable exhaust valve 123 is provided with a valve body 23, a pair of tubular-shaped first and second bush members 25a and 25b (see FIG. 6) mounted on axially opposite ends of the valve body 23, and a columnar-shaped shaft member 24 (see FIG. 6) mounted on an axial end of the valve body 23. The valve body 23 includes a first butterfly valve 23a, a second butterfly valve 23bc, and a third butterfly valve 23d; and a first shaft portion 23x for connecting the first and second butterfly valves 23a and 23bc, and a second shaft portion 23y for connecting the second and third butterfly valves 23bc and 23d. The first and second bush members 25a and 25b are components for rotatably supporting the valve body 23 around an axis thereof. The first and second bush members 25a and 25b are disposed to axially project from opposite ends of the valve body 23. The shaft member 24 axially passes through the first bush member 25a, and projects from the first bush member 25a by a predetermined length within the valve body 23 (within the first butterfly valve 23a). A portion of the shaft member 24 projecting from the first bush member 25a is connected to the valve body 23 in such a manner that relative rotation of the shaft member 24 with respect to the valve body 23 is disabled (see FIG. 6 and FIG. 7).

The valve body 23 includes, at axially opposite ends thereof, first and second boss portion 23e and 23f, whose diameter is larger than the diameter of the shaft portions 23x and 23y for receiving the first and second bush members 25a and 25b, respectively.

Figure 5:
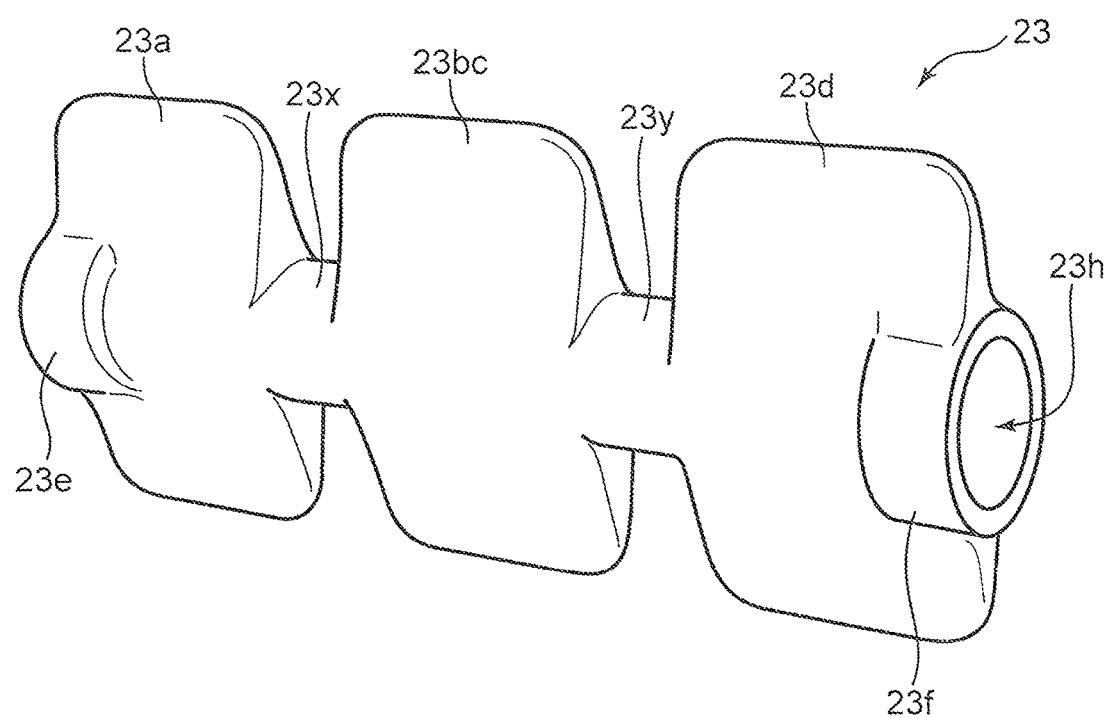
FIG. 5 is a perspective view of a valve body of a variable exhaust valve for use in an exhaust system of the engine.
Figure 6:
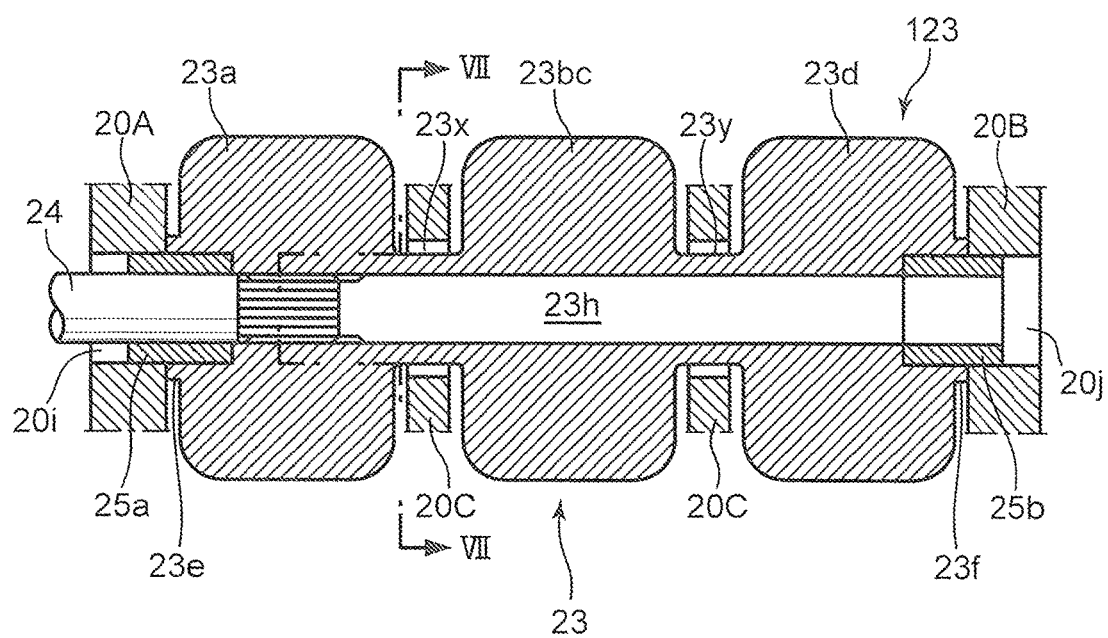
FIG. 6 is a sectional view along an axis of the variable exhaust valve.

The first boss portion 23e has such a shape that the first butterfly valve 23a is partially bulged in the radial direction, and the second boss portion 23f has such a shape that the third butterfly valve 23d is partially bulged in the radial direction. As illustrated in FIG. 5, FIG. 6, and the like, each of the amount of the first boss portion 23a axially projecting from the outer periphery of the first butterfly valve 23a, and the amount of the second boss portion 23f axially projecting from the outer periphery of the third butterfly valve 23d is set to be sufficiently small, and shorter than at least the axial length of the shaft portions 23x and 23y.

The first bush member 25a is mounted in such a manner that a part thereof is axially received in an end (first boss portion 23e) of the valve body 23, and that the remaining part thereof axially projects from the end of the valve body 23. Likewise, the second bush member 25b is mounted in such a manner that a part thereof is axially received in the other end (second boss portion 23f) of the valve body 23, and that the remaining part thereof axially projects from the other end of the valve body 23.

A hollow portion 23h capable of receiving the bush members 25a and 25b, and the shaft member 24 is formed in the axial center of the valve body 23 in such a manner as to axially pass through the valve body 23.

The structure of the valve body 23 is described in more detail. The valve body 23 is integrally formed of heat-resistant steel. The valve body 23 includes, in the order from an axial end thereof (from the left side in FIG. 4 and FIG. 6), the first butterfly valve 23a to be disposed in the first lower independent passage 22a of the exhaust manifold 20, the tubular-shaped first shaft portion 23x, the second butterfly valve 23bc to be disposed in the second lower independent passage 22bc, the tubular-shaped second shaft portion 23y, and the third butterfly valve 23d to be disposed in the third lower independent passage 22d. The shaft portions 23x and 23y are located on the axial center of the valve body 23. The butterfly valves 23a, 23bc, and 23d are formed to have a large thickness at the axial center portion thereof. The surfaces of the shaft portions 23x and 23y, and the surfaces of the butterfly valves 23a, 23bc, and 23d are smoothly continued to each other. The first boss portion 23e is formed on a lateral portion of the first butterfly valve 23a constituting an end of the valve body 23. The second boss portion 23f is formed on a lateral portion of the third butterfly valve 23d constituting the other end of the valve body 23.

The hollow portion 23h is formed into a circular shape in section so as to receive the tubular-shaped bush members 25a and 25b, and the columnar-shaped shaft member 24. The inner diameter of the hollow portion 23h at axially opposite ends of the hollow portion 23h corresponding to the boss portions 23e and 23f is made larger than the inner diameter of the other portion of the hollow portion 23h, in other words, the axial middle portion of the hollow portion 23h.

The bush members 25a and 25b are axially received from the outside of opposite ends of the valve body 23 into opposite ends of the hollow portion 23h, whose diameter is large as described above (in other words, into the boss portions 23e and 23f). The shaft member 24 is inserted into the hollow portion 23h from the outside of one end of the valve body 23 in a state that the bush member 25a is received. According to this configuration, the shaft member 24 axially passes through the first bush member 25a, and projects toward the other end from the first bush member 25a within the one end of the valve body 23.

Figure 7:
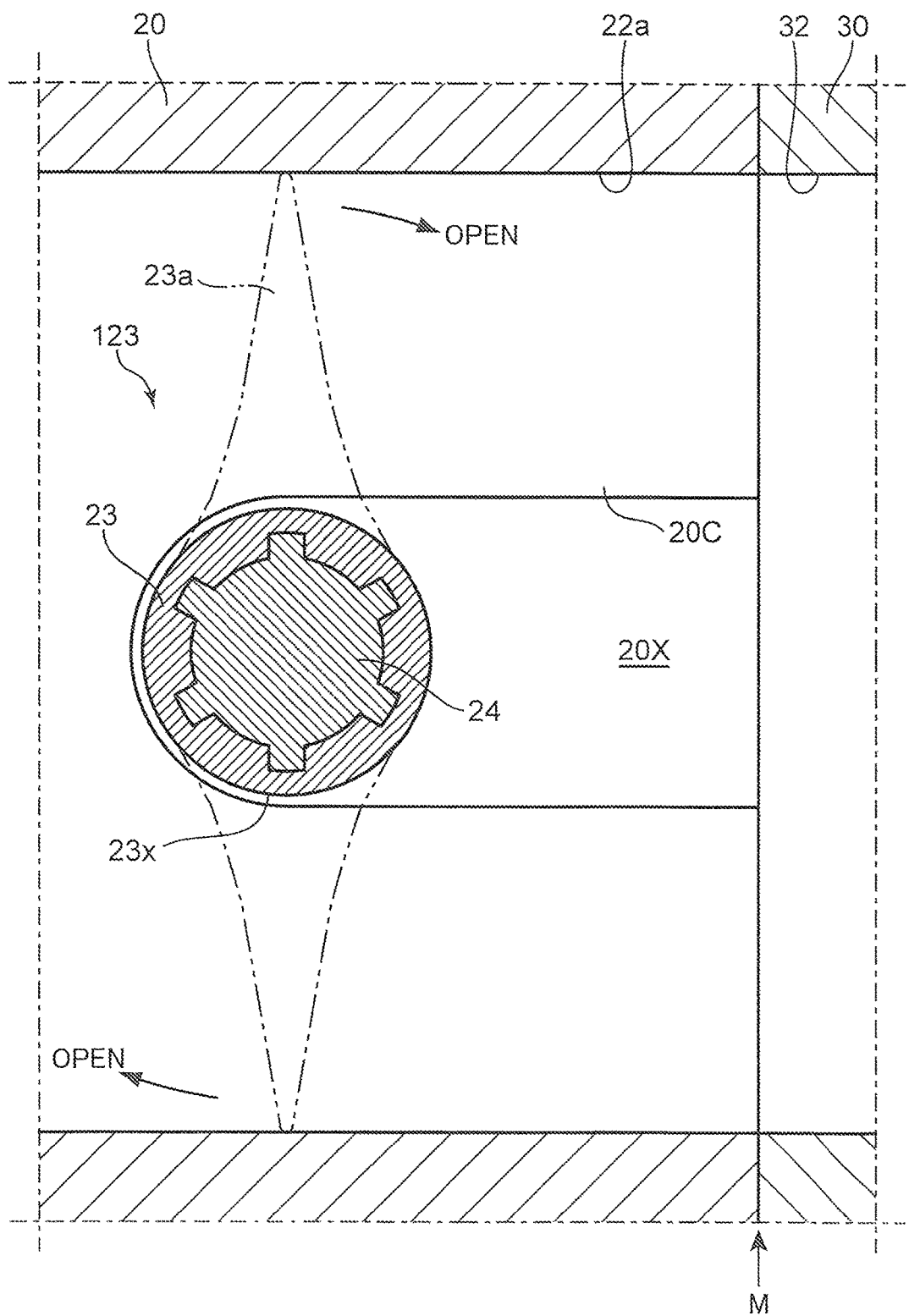
FIG. 7 is an arrow sectional view taken along the line VII-VII in FIG. 6.

Specifically, as illustrated in FIG. 6 and FIG. 7, the shaft member 24 includes a spline projection at a portion thereof projecting from the bush member 25a. By engagement of the spline projection in a spline groove formed in the inner peripheral surface of the hollow portion 23h, the shaft member 24 is non-rotatably engaged with the valve body 23 (spline engagement). In the embodiment, the shaft member 24 is a component for transmitting a rotational force to be input from an external actuator (not illustrated) to the valve body 23. Therefore, the shaft member 24 is received into the hollow portion 23h by a predetermined required length for this purpose. In view of the above, the shaft member 24 does not extend over the entire length of the valve body 23, and is relatively short.

As illustrated in FIG. 3 and FIG. 7, the variable exhaust valve 123 is mounted near a joining surface portion M between the upstream-side exhaust manifold 20 and the downstream-side supercharger casing 30, which constitute the exhaust passage 33 of the engine 1.

Specifically, a concave portion 20X (see FIG. 7 and FIG. 8), which is cut out in a partition wall 20C from the downstream side toward the upstream side, is formed in the partition wall 20C located between the first to third lower independent passages 22a, 22bc, and 22d (corresponding to a plurality of passages in the claims) in the exhaust manifold 20. The variable exhaust valve 123 is supported in a state that the shaft portions 23x and 23y of the valve body 23 are accommodated in the upstream end of the concave portion 20X.

The exhaust manifold 20 includes a first support wall 20A, which is a vertical wall for isolating the first lower independent passage 22a at one end of the valve body 23, and a second support wall 20B, which is a vertical wall for isolating the third lower independent passage 22d on the other end of the valve body 23. The first support wall 20A forms the first lower independent passage 22a by cooperation with the partition wall 20C between the first lower independent passage 22a and the second lower independent passage 22bc. The second support wall 20B forms the third lower independent passage 22d by cooperation with the partition wall 20C between the second lower independent passage 22bc and the third lower independent passage 22d. Each of the support walls 20A and 20B is formed with support holes 20i and 20j (see FIG. 6) of a circular shape in section, which pass through the support walls 20A and 20B in the thickness direction (in the axial direction of the valve body 23). Portions of the bush members 25a and 25b, which axially project from opposite ends of the valve body 23 (outwardly projecting from the valve body 23) are received in the support holes 20i and 20j, respectively. The valve body 23 is rotatably supported on the exhaust manifold 20 around an axis thereof via the portions of the bush members 25a and 25b which are received in the support holes 20i and 20j.

Figure 8:
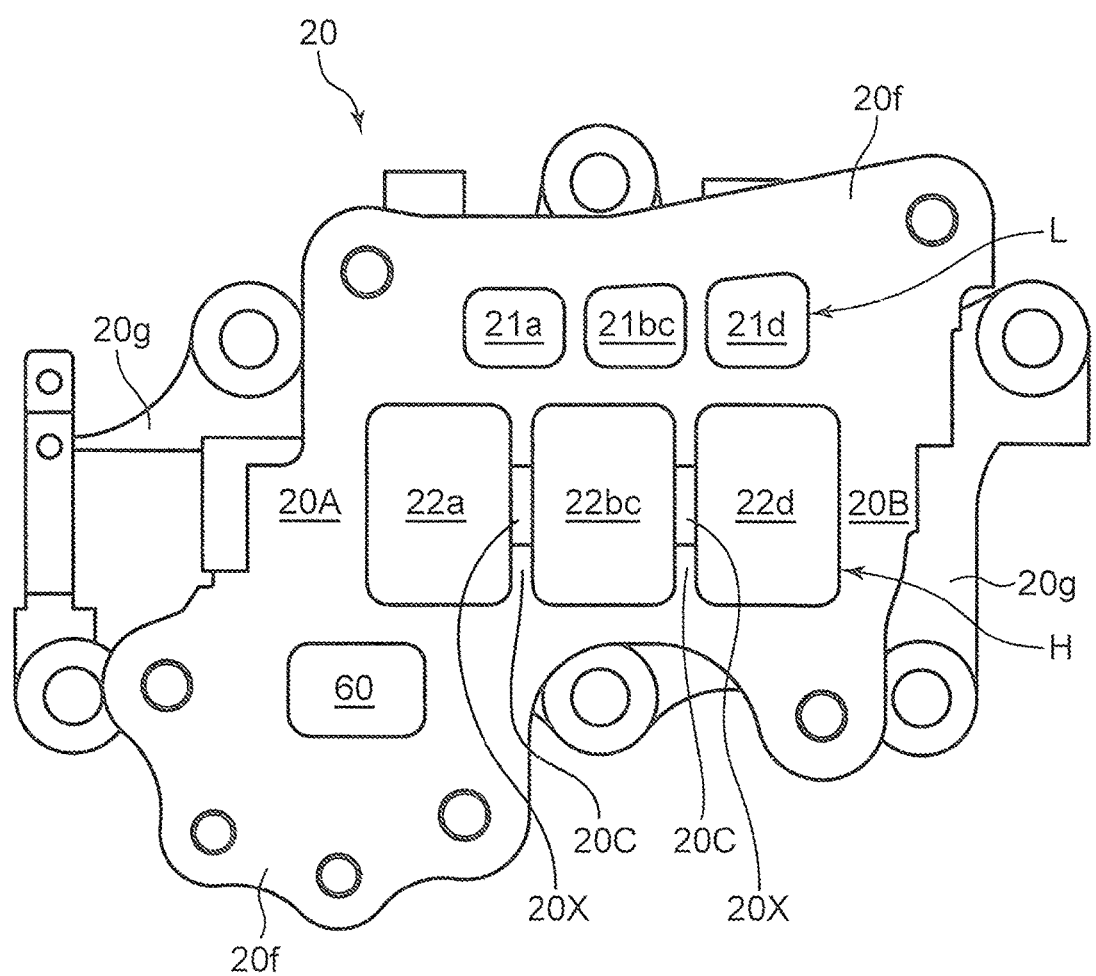
FIG. 8 is a diagram illustrating that the variable exhaust valve is removed from the state illustrated in FIG. 4.
Figure 9:
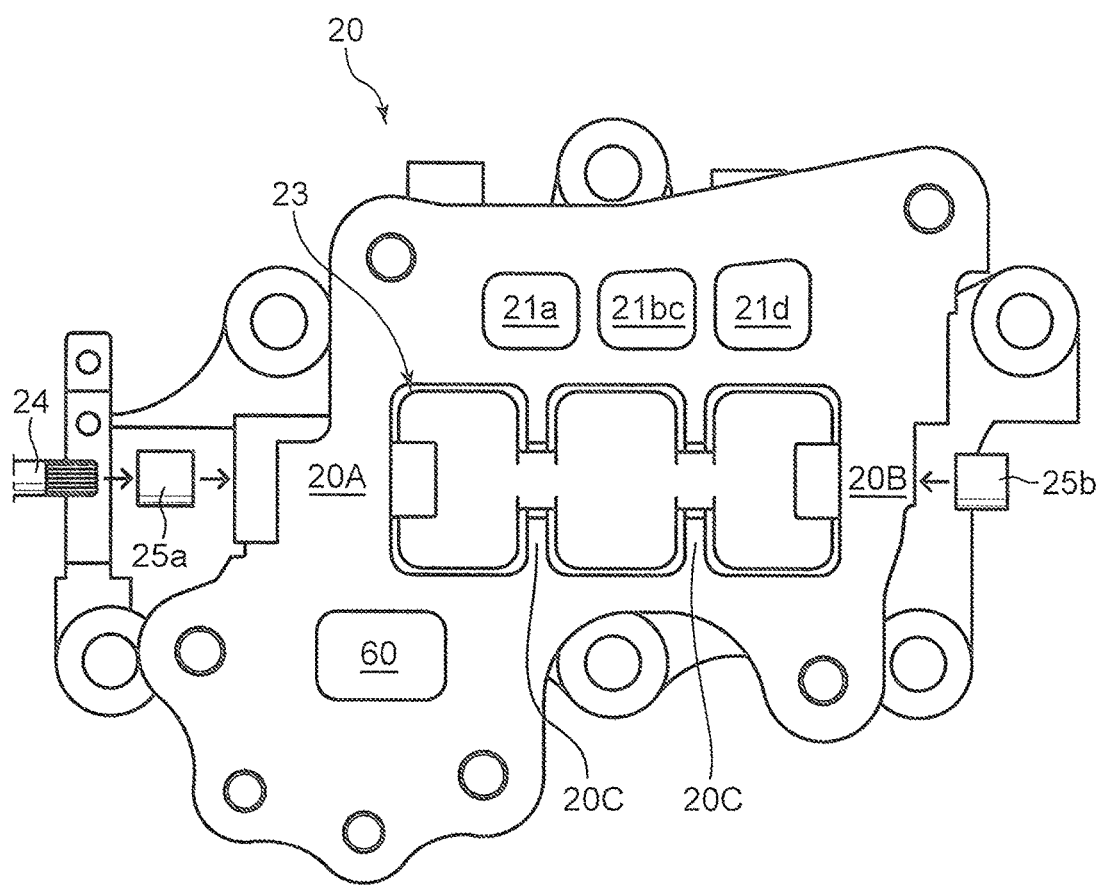
FIG. 9 is a diagram illustrating a sequence of mounting the variable exhaust valve from the state illustrated in FIG. 8.

Next, a sequence of mounting the variable exhaust valve 123 is described. In order to mount the variable exhaust valve 123 in the exhaust passage 33, first of all, as illustrated in FIG. 8 and FIG. 9, the valve body 23 is mounted in the exhaust manifold 20 before the exhaust manifold 20 is connected to the supercharger casing 30. Specifically, the valve body 23 is inserted into the first to third lower independent passages 22a, 22bc, and 22d from the side of the join surface (in other words, from the side of the mounting flange 20f) between the exhaust manifold 20 and the supercharger casing 30.

According to the aforementioned operation, as illustrated in FIG. 7, the shaft portions 23x and 23y of the valve body 23 are accommodated in the upstream end of the concave portion 20X in the partition wall 20C. The concave portion 20X is formed to have a width (a height in the up-down direction in FIG. 7) larger than the diameter of the shaft portions 23x and 23y by a predetermined amount so as to facilitate receiving the shaft portions 23x and 23y of the valve body 23. Therefore, a gap is formed between the shaft portions 23x and 23y, and the concave portion 20X in a state that the shaft portions 23x and 23y of the valve body 23 are accommodated in the concave portion 20X. Further, the upstream end of the concave portion 20X has an arc shape. Therefore, a gap is also formed between the shaft portions 23x and 23y of the valve body 23, and the upstream end of the concave portion 20X.

In this state, the hollow portion 23h of the valve body 23, and the support holes 20i and 20j in the first support wall 20A and the second support wall 20B of the exhaust manifold 20 are coaxially aligned with each other.

Next, as illustrated in FIG. 9, the bush members 25a and 25b are inserted from the outside of opposite ends of the valve body 23 through the support holes 20i and 20j, and are received in the boss portions 23e and 23f of the valve body 23. In this case, tip ends of the bush members 25a and 25b in the insertion direction are received in the valve body 23, and the remaining part (rear ends in the insertion direction) thereof project outwardly from opposite ends of the valve body 23, and remain in the support holes 20i and 20j. In this way, the bush members 25a and 25b are rotatably supported on the support walls 20A and 20B (see FIG. 6).

Next, as illustrated in FIG. 9, the shaft member 24 is inserted from the outside of one end of the valve body 23 through the first bush member 25a supported in the support hole 20i of the first support wall 20A, and is received in the hollow portion 23h of the valve body 23. Before the aforementioned operation is performed, each of the tip ends of the shaft member 24 in the insertion direction, and the hollow portion 23h of the valve body 23 is subjected to spline processing. According to this configuration, the valve body 23 and the shaft member 24 are spline-engaged with each other, accompanied by insertion of the shaft member 24. The rear end (see FIG. 4) of the shaft member 24 in the insertion direction is interconnected to an unillustrated actuator. The shaft member 24 is rotated by the actuator, and as illustrated by the arrow in FIG. 7, the valve body 23 is driven to open and close. Note that the support hole 20j in the second support wall 20B may be sealed by a cap or the like from the outside, after the bush member 25b is inserted.

Next, the supercharger casing 30 is mounted on the exhaust manifold 20. Specifically, the mounting flange 20f of the exhaust manifold 20 and the mounting flange 30f of the supercharger casing 30 are abutted to each other, and the mounting flanges 20f and 30f are connected to each other with use of the engagement member V9 constituted by a stud bolt and a nut. Thus, the supercharger casing 30 is mounted on the exhaust manifold 20. In this way, mounting the variable exhaust valve 123 in the exhaust passage 33 is completed.

In the embodiment, the following operations are obtained by the aforementioned configuration.

(1) The variable exhaust valve 123 in the embodiment is provided with the valve body 23 including the butterfly valves 23a, 23bc, and 23d, and the shaft portions 23x and 23y for connecting the butterfly valves to each other; the paired bush members 25a and 25b mounted on axial ends of the valve body 23 and configured to be rotatably supported on the exhaust manifold 20; and the shaft member 24 axially passing through the bush member 25a, and projecting from the bush member 25a by a predetermined length within one end of the valve body 23. Each of the bush members 25a and 25b is mounted in such a manner that a part of each of the bush members 25a and 25b is axially received in an end of the valve body 23, and that the remaining part thereof axially projects from the end of the valve body 23. A portion of the shaft member 24 projecting from the bush member 25a is connected to the valve body 23 in such a manner that relative rotation of the shaft member 24 with respect to the valve body 23 is disabled.

According to the aforementioned configuration, it is possible to mount the valve body 23 to the exhaust manifold 20 via the bush members 25a and 25b, which are mounted in such a manner as to partially project from opposite ends of the valve body 23.

Further, it is possible to shorten the span (axial dimension) of the valve body 23, and to enhance the reliability of the variable exhaust valve 123. For instance, as compared with a configuration, in which support shaft portions axially projecting from opposite ends of a valve body 23 are integrally formed, and the support shaft portions are inserted in support walls 20A and 20B of an exhaust manifold 20 for supporting the valve body 23, the aforementioned configuration does not require to project the support shaft portions. This makes it possible to shorten the distance between both ends of the valve body 23, in other words, shorten the span.

Therefore, it is possible to suppress a degree of deformation of the butterfly valves 23a, 23bc, and 23d, and the shaft portions 23x and 23y constituting the valve body 23 by heat or pressure of exhaust gas We. This is advantageous in smoothly performing opening/closing operations of the variable exhaust valve 123 and in enhancing the reliability.

As described above, deformation of the valve body 23 is suppressed. Therefore, it is possible to make the margin (clearance) between the valve body 23, and the bush members 25a and 25b small. This makes it possible to keep the precision of opening/closing operations, and to secure the reliability of the variable exhaust valve 123 in this sense. Further, it is possible to reduce rattling noise between the valve body 23, and the bush members 25a and 25b; and to suppress generation of noise.

Furthermore, the shaft member 24 is partially received in the valve body 23 from an end of the valve body 23. Therefore, even if the valve body 23 is deformed, it is possible to avoid excessive application of load accompanied by the deformation on the shaft member 24. This makes it possible to keep the precision of a rotating operation of the shaft member 24, and consequently, to secure the reliability of the variable exhaust valve 123.

(2) The hollow portion 23h capable of receiving the bush members 25a and 25b, and the shaft member 24 is formed in the axial center of the valve body 23 in such a manner as to axially pass through the valve body 23. According to this configuration, the axial center of the valve body 23 is formed into a hollow portion. This makes it possible to make the valve body 23 lightweight while securing a required rigidity. Further, this makes it easy to insert the bush members 25a and 25b, and the shaft member 24 into the valve body 23.

(3) The valve body 23 includes, at opposite ends thereof, the boss portions 23e and 23f, whose diameter is larger than the diameter of the shaft portions 23x and 23y for receiving the bush members 25a and 25b, respectively. According to this configuration, the valve body 23 is formed into a stereoscopic shape. This is advantageous in enhancing the rigidity of the valve body 23.

(4) The engine 1 is provided with the exhaust manifold 20 and the supercharger casing 30, which constitute the exhaust passage 33. The exhaust manifold 20 is such that the surface thereof on the downstream side is connected to the surface of the supercharger casing 30 on the upstream side, and internally includes the first to third lower independent passages 22a, 22bc, and 22d to be separated by the partition wall 20C. The concave portion 20X, which is cut out in the partition wall 20C from the downstream side toward the upstream side, is formed in the partition wall 20C of the exhaust manifold 20. The shaft portions 23x and 23y of the valve body 23 are accommodated in the upstream end of the concave portion 20X. According to this configuration, accommodating the shaft portions 23x and 23y of the valve body 23 in the concave portion 20X before the exhaust manifold 20 and the supercharger casing 30 are connected to each other makes it easy to mount the variable exhaust valve 123 in the exhaust passage 33 of the engine 1. Further, the shaft portions 23x and 23y of the valve body 23 are located at the upstream end of the concave portion 20X. This makes it possible to minimize the adverse influence i.e. leakage of exhaust gas on the upstream side toward the downstream side through a gap, even if the gap is formed between the shaft portions 23x and 23y, and the concave portion 20X when the variable exhaust valve 123 is closed.

(5) The exhaust passage 33 is provided with the low-speed passage L, and the high-speed passage H whose flow area of exhaust gas is larger than the low-speed passage L. The low-speed passage L is provided with, from the upstream side, the upper independent passages 21a, 21bc, and 21d associated with the cylinders 4, and the upper collective passage 31 in which exhaust gas discharged from the upper independent passages 21a, 21bc, and 21d is collected. The high-speed passage H is provided with, from the upstream side, the lower independent passages 22a, 22bc, and 22d associated with the cylinders 4, and the lower collective passage 32 in which exhaust gas discharged from the lower independent passages 22a, 22bc, and 22d is collected. The variable exhaust valve 123 is provided in the independent passages 22a, 22bc, and 22d of the high-speed passage H, and is driven to close each of the independent passages 22a, 22bc, and 22d when the engine 1 is in a low speed range (throttle control). Accompanied by the throttle control, exhaust gas is allowed to pass only through the low-speed passage IL whose flow area is small. Therefore, even when the engine 1 is in a low speed range where the flow volume of exhaust gas is small, exhaust gas is discharged at a high speed from the upper independent passages 21a, 21bc, and 21d of the low-speed passage L to the upper collective passage 31, and a strong negative pressure by an ejector effect is generated in the upper collective passage 31. This makes it possible to suck the residual gas in the cylinders 4 by using the negative pressure, and to improve the output of the engine 1 by enhancing the scavenging performance of the cylinders 4 (dynamic exhaust effect).

In particular, in the embodiment, the turbine 52 of the turbocharger 50 is provided in the exhaust passage 33. Therefore, executing throttle control by closing the variable exhaust valve 123 when the engine 1 is in a low speed range makes it possible to increase the flow velocity of exhaust gas acting on the turbine 52 for increasing the supercharging pressure. This is advantageous in further improving the output of the engine 1 (dynamic supercharging effect).

As described in the embodiment, the variable exhaust valve 123 is used as a constituent element of a dynamic exhaust system or a dynamic supercharging system provided in the exhaust passage 33 of the engine 1. In this configuration, the reliability of the variable exhaust valve 123 is sufficiently high as described above. Therefore, it is possible to securely exhibit a dynamic exhaust effect or a dynamic supercharging effect with use of the variable exhaust valve 123.

Further, when the engine 1 is in a high speed range, throttle control is released, and the independent passages 22a, 22bc, and 22d of the high-speed passage H are opened. This makes it possible to avoid obstruction of flow of exhaust gas (an increase in the exhaust resistance) due to an excessive increase in the internal pressure of the exhaust passage 33, and to sufficiently secure an output even when the engine 1 is in a high speed range.

Figure 10A:
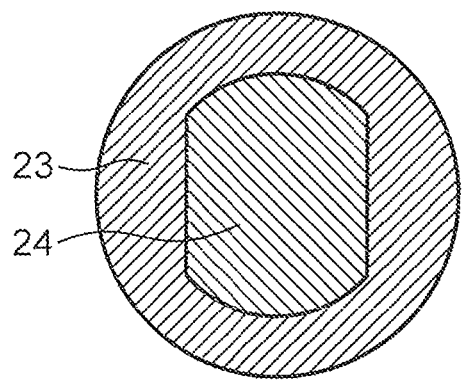
FIG. 10A is a diagram corresponding to FIG. 7 and illustrating a modification of the embodiment.
Figure 10B:
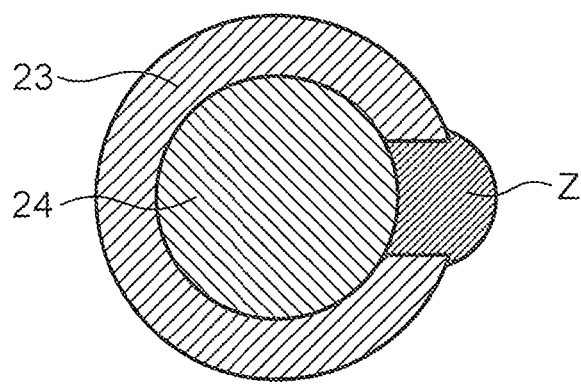
FIG. 10B is a diagram corresponding to FIG. 7 and illustrating another modification of the embodiment.

In the embodiment, the valve body 23 and the shaft member 24 are spline-engaged with each other as a connection pattern of the valve body 23 and the shaft member 24. Alternatively, for instance, as illustrated in FIG. 10A, each of the hollow portion 23h of the valve body 23 and the shaft member 24 is formed into a two-face width portion, or as illustrated in FIG. 10B, the valve body 23 and the shaft member 24 may be welded via an opening formed in the valve body 23 (see a welded portion Z).

Further, in the embodiment, the variable exhaust valve 123 is provided in the exhaust passage 33 of the engine 1. Alternatively, for instance, a swirl valve may be provided in the intake passage 19 or in the intake port 5, in place of the variable exhaust valve 123 or in combination with the variable exhaust valve 123.

<Summary of Embodiment>

Lastly, the features and the advantageous effects based on the features disclosed in the embodiment will be briefly described.

The technique disclosed in the embodiment relates to a structure of an opening/closing valve for opening and closing at least one of an intake passage and an exhaust passage of an engine. The structure is provided with a valve body including a plurality of butterfly valves, and a shaft portion for connecting the butterfly valves to each other; a pair of bush members mounted on axially opposite ends of the valve body, and configured to be rotatably supported on a wall portion of the intake passage or of the exhaust passage; and a shaft member axially passing through one of the bush members, and projecting from the bush member by a predetermined length within an end of the valve body. Each of the bush members is mounted in such a manner that a part of the bush member is axially received in an end of the valve body, and a remaining part thereof axially projects from the end of the valve body. A portion of the shaft member projecting from the one of the bush members is connected to the valve body in such a manner that relative rotation of the shaft member with respect to the valve body is disabled.

In the aforementioned structure, a part of the paired bush members is received in opposite ends of the valve body, and the remaining part of the bush members axially projects from opposite ends of the valve body. Therefore, it is possible to mount the valve body in the intake passage or in the exhaust passage via the projecting portions of the bush members.

Further, it is possible to shorten the span (axial dimension) of the valve body, and to enhance the reliability of the opening/closing valve. For instance, as compared with a configuration, in which support shaft portions axially projecting from opposite ends of a valve body are integrally formed, and the support shaft portions are inserted in a wall portion of an intake passage or of an exhaust passage for supporting the valve body, the aforementioned configuration does not require to project the support shaft portions. This makes it possible to shorten the span of the valve body (the distance between both ends of the valve body to be rotatably supported). Therefore, it is possible to suppress a degree of deformation of the butterfly valves, and the shaft portion constituting the valve body by heat or pressure. This is advantageous in smoothly performing opening/closing operations of the opening/closing valve and in enhancing the reliability.

Further, deformation of the valve body is suppressed. Therefore, it is possible to make the margin (clearance) between the valve body and the bush members small. This makes it possible to keep the precision of opening/closing operations, and to secure the reliability of the opening/closing valve in this sense. Further, it is possible to reduce rattling noise between the valve body and the bush members, and to suppress generation of noise.

Further, the shaft member is partially received in the valve body from an end of the valve body. Therefore, even if the valve body is deformed, it is possible to avoid excessive application of load accompanied by the deformation on the shaft member. This makes it possible to keep the precision of a rotating operation of the shaft member, and consequently, to secure the reliability of the opening/closing valve.

In the aforementioned structure, preferably, a hollow portion capable of receiving the bush members and the shaft member may be formed in an axial center of the valve body in such a manner as to axially pass through the valve body.

According to the aforementioned configuration, the axial center of the valve body is formed into a hollow portion. This makes it possible to make the valve body lightweight while securing a required rigidity. Further, this makes it easy to insert the bush members and the shaft member into the valve body.

In the aforementioned structure, preferably, the valve body may include, at opposite ends thereof, boss portions, whose diameter is larger than a diameter of the shaft portion for receiving the bush members.

According to the aforementioned configuration, the valve body is formed into a stereoscopic shape accompanied by formation of the boss portions. This is advantageous in enhancing the rigidity of the valve body.

In the aforementioned structure, preferably, the engine may be provided with an upstream housing member and a downstream housing member constituting the intake passage or the exhaust passage. The upstream housing member may include a surface thereof on a downstream side to be connected to a surface of the downstream housing member on an upstream side, and may internally include a plurality of passages to be separated by a partition wall. A concave portion cut out in the partition wall from the downstream side toward the upstream side may be formed in the partition wall of the upstream housing member. The shaft portion of the valve body may be accommodated in an upstream end of the concave portion.

According to the aforementioned configuration, accommodating the shaft portion of the valve body in the concave portion of the upstream housing member before the upstream housing member and the downstream housing member are connected to each other makes it easy to mount the opening/closing valve in the intake passage or in the exhaust passage of the engine. Further, the shaft portion of the valve body is located at the upstream end of the concave portion. This makes it possible to minimize the adverse influence i.e. leakage of exhaust gas on the upstream side toward the downstream side through a gap, even if the gap is formed between the shaft portion and the concave portion when the opening/closing valve is closed.

In the aforementioned structure, preferably, the exhaust passage may be provided with a first passage, and a second passage whose flow area of exhaust gas is larger than the first passage. Each of the first passage and the second passage may be provided with, from an upstream side, a plurality of independent passages associated with cylinders, and a collective passage for collecting exhaust gas discharged from the independent passages. The opening/closing valve may be provided in the independent passages of the second passage.

When the opening/closing valve is closed, exhaust gas is allowed to pass only through the first passage whose flow area is small. Therefore, even when the engine is in a low speed range where the flow volume of exhaust gas is small, exhaust gas is discharged at a high speed from the independent passages of the first passage to the collective passage, and a strong negative pressure by an ejector effect is generated in the collective passage. This makes it possible to suck the residual gas in the cylinders by using the negative pressure, and to improve the output of the engine by enhancing the scavenging performance of the cylinders.

Further, when the opening/closing valve is opened, exhaust gas is allowed to pass through both of the first passage and the second passage. This makes it possible to increase the flow area of exhaust gas. Therefore, for instance, when the engine is in a high speed range where the flow volume of exhaust gas is large, opening the opening/ closing valve makes it possible to prevent an increase in the exhaust resistance and lowering of the output accompanied by the increase in the exhaust resistance.

The invention claimed is:

1. A structure of an opening/closing valve for opening and closing at least one of an intake passage and an exhaust passage of an engine, the opening/closing valve structure comprising:
   a valve body including a plurality of butterfly valves, and a shaft portion for connecting the butterfly valves to each other;
   a pair of bush members mounted on axially opposite ends of the valve body, and configured to be rotatably supported on a wall portion of the intake passage or of the exhaust passage; and
   a shaft member axially passing through one of the bush members, and projecting from the one of the bush members by a predetermined length within one of the axially opposite ends of the valve body, wherein
   a hollow portion capable of receiving the bush members and the shaft member is formed in an axial center of the valve body,
   each of the bush members is mounted in such a manner that a part of each of the bush members is axially received in an end of the hollow portion of the valve body, and a remaining part thereof axially projects from the axially opposite ends of the valve body,
   one end portion of the shaft member projecting from the one of the bush members within the hollow portion is connected to the valve body in such a manner that relative rotation of the shaft member with respect to the valve body is disabled,
   the shaft member includes a spline projection at the one end portion thereof and is non-rotatably engaged with the valve body by engagement of the spline projection in a spline groove formed in an inner peripheral surface of the hollow portion,
   the hollow portion is formed to penetrate fully through the valve body, and
   the shaft member extends only part way through the hollow portion.

2. The opening/closing valve structure according to claim 1, wherein
   the hollow portion is formed in the axial center of the valve body in such a manner as to axially pass through the valve body.

3. The opening/closing valve structure according to claim 1, wherein
   the valve body includes, at the axially opposite ends thereof, boss portions, whose diameter is larger than a diameter of the shaft portion for receiving the bush members.

4. The opening/closing valve structure according to claim 1, wherein
   the engine is provided with an upstream housing member and a downstream housing member constituting the intake passage or the exhaust passage,
   the upstream housing member includes a surface thereof on a downstream side to be connected to a surface on an upstream side of the downstream housing member, and internally includes a plurality of passages to be separated by a partition wall,
   a concave portion cut out in the partition wall from the downstream side toward the upstream side is formed in the partition wall of the upstream housing member, and
   the shaft portion of the valve body is accommodated in an upstream end of the concave portion.

5. The opening/closing valve structure according to claim 1, wherein
   the exhaust passage is provided with a first passage, and a second passage whose flow area of exhaust gas is larger than the first passage,
   each of the first passage and the second passage is provided with, from an upstream side, a plurality of independent passages associated with cylinders, and a collective passage for collecting exhaust gas discharged from the independent passages, and
   the opening/closing valve structure is provided in the independent passages of the second passage.

6. A structure of an opening/closing valve for opening and closing an exhaust passage of an engine, the opening/closing valve structure comprising:
   a valve body including a plurality of butterfly valves, a shaft portion for connecting the butterfly valves to each other, and first and second boss portions formed at axially opposite ends of the valve body, the butterfly valves, the shaft portion, and the first and second boss portions being integrally formed with each other;
   first and second bush members rigidly mounted on the first and second boss portions, and configured to be rotatably supported on a wall portion of the exhaust passage; and
   a hollow portion is formed in at least the first boss portion and one of the butterfly valves connected to the first boss portion,
   a shaft member projects from the first bush member by a predetermined length that is shorter than the valve body within the hollow portion,
   the first bush member is mounted in such a manner that a part of the first bush member is axially received in an end of the hollow portion of the valve body corresponding to the first boss portion, and a remaining part thereof axially projects from one of the axially opposite ends of the valve body corresponding to the first boss portion,
   one end portion of the shaft member projecting from the first bush member within the hollow portion is connected to the valve body in such a manner that relative rotation of the shaft member with respect to the valve body is disabled,
   the shaft member includes a spline projection at the one end portion thereof and is non-rotatably engaged with the valve body by engagement of the spline projection in a spline groove formed in an inner peripheral surface of the hollow portion,
   the engine is provided with an upstream housing member and a downstream housing member constituting the exhaust passage,
   the upstream housing member includes a surface thereof on a downstream side to be connected to a surface on an upstream side of the downstream housing member, and internally includes a plurality of passages to be separated by a partition wall,
   a concave portion cut out in the partition wall from the downstream side toward the upstream side is formed in the partition wall of the upstream housing member, and
   the shaft portion of the valve body is accommodated in an upstream end of the concave portion.

7. The opening/closing valve structure according to claim 6, wherein
   the exhaust passage is provided with a first passage, and a second passage whose flow area of exhaust gas is larger than the first passage, the first passage is provided with, from an upstream side, a plurality of first independent passages associated with cylinders, and a first collective passage for collecting exhaust gas discharged from the first independent passages, the second passage is provided with, from an upstream side, a plurality of second independent passages associated with the cylinders, and a second collective passage for collecting exhaust gas discharged from the second independent passages, the opening/closing valve structure is provided in the second independent passages of the second passage and has a function of closing the second passage to allow the exhaust gas to pass only through the first passage, and the shaft portion of the valve body is accommodated in the upstream end of the concave portion so as to minimize leakage of exhaust gas on the upstream side toward the downstream side through a gap formed between the shaft portion and the concave portion when the plurality of butterfly valves are closed.

8. A structure of an opening/closing valve for opening and closing an exhaust passage of an engine, the opening/closing valve structure comprising:

a valve body including a plurality of butterfly valves, a shaft portion for connecting the butterfly valves to each other, and first and second boss portions formed at axially opposite ends of the valve body, the butterfly valves, the shaft portion, and the first and second boss portions being integrally formed with each other;

first and second bush members rigidly mounted on the first and second boss portions, and configured to be rotatably supported on a wall portion of the exhaust passage; and a hollow portion is formed in at least the first boss portion and one of the butterfly valves connected to the first boss portion, a shaft member projects from the first bush member by a predetermined length that is shorter than the valve body within the hollow portion, the first bush member is mounted in such a manner that a part of the first bush member is axially received in an end of the hollow portion of the valve body corresponding to the first boss portion, and a remaining part thereof axially projects from one of the axially opposite ends of the valve body corresponding to the first boss portion, one end portion of the shaft member projecting from the first bush member within the hollow portion is connected to the valve body in such a manner that relative rotation of the shaft member with respect to the valve body is disabled, and the shaft member includes a spline projection at the one end portion thereof and is non-rotatably engaged with the valve body by engagement of the spline projection in a spline groove formed in an inner peripheral surface of the hollow portion.

* * * * *